Feb. 13, 1945.  W. P. SCHAMBRA ET AL  2,369,610
PURIFICATION OF CHLORINE-CONTAINING GASES
Filed April 22, 1942
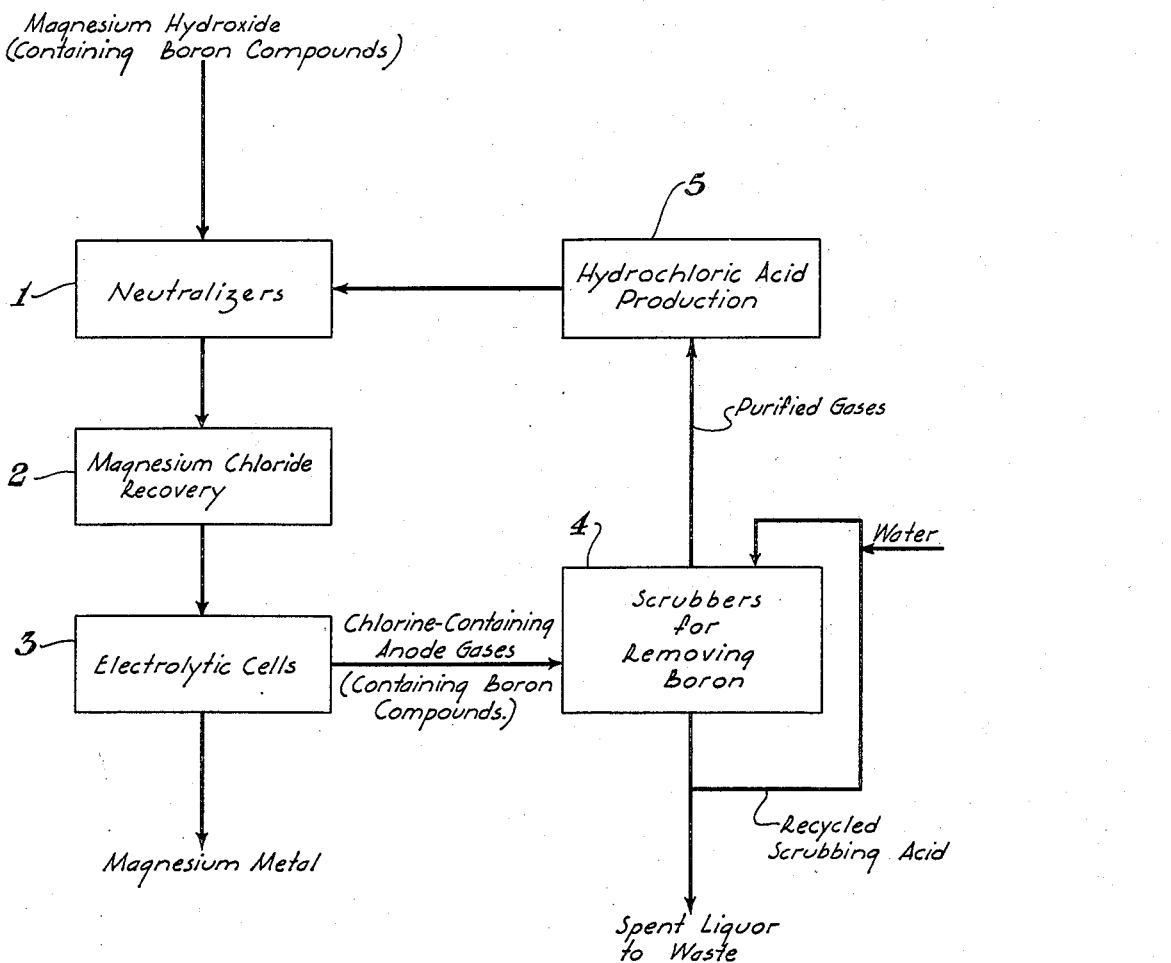
INVENTOR.
William P. Schambra
BY Claire M. Shigley
Griswold & Burdick
ATTORNEYS Patented Feb. 13, 1945

2,369,610

UNITED STATES PATENT OFFICE 2,369,610

PURIFICATION OF CHLORINE-CONTAINING GASES

William P. Schambra and Claire M. Shigley, Freeport, Tex., assignors to The Dow Chemical Company, Midland, Mich., a corporation of Michigan Application April 22, 1942, Serial No. 440,008

2 Claims. (Cl. 204—70)

This invention relates to a process for the removal of gaseous boron compounds from admixture with chlorine-containing gases, especially elemental chlorine and hydrogen chloride. It particularly concerns the application of this new process to the purification of boron-impurity-containing anode gases formed under certain conditions in the electrolytic production of metallic magnesium.

A well known process for the production of metallic magnesium involves treating magnesia-containing material, such as magnesium hydroxide, magnesite, or dolomite, with aqueous hydrochloric acid to form magnesium chloride, this latter then being recovered in solid form and eelctrolyzed in a fused alkali metal halide bath to liberate the desired magnesium. During the electrolysis, the chlorine present is the magnesium chloride is evolved as an anode gas essentially comprising chlorine and hydrogen chloride, and it is conventional, as a matter of chlorine economy, to process this gas to regenerate aqueous hydrochloric acid which is then circulated to re-use in the first step of the process.

While such a cyclic process is satisfactory in many localities, difficulties arise when the magnesia-containing raw material contains as impurity an appreciable proportion, e. g. 0.001 per cent by weight or more, of inorganic boron compounds, because of the tendency of these compounds to accumulate in the system. In particular, it has been found that the boron impurities in the raw material are retained by the magnesium chloride formed in the hydrochloric acid treatment, and hence enter the electrolytic cell together therewith. In the cell they are converted in part to gaseous boron compounds, probably to boron trichloride, and eventually escape from the cell in admixture with the chlorine-containing anode gases. Then, when these anode gases are processed to regenerate hydrochloric acid, the gaseous boron impurities are simultaneously converted to boric acid or similar substances which dissolve in the hydrochloric acid and re-enter the process therewith. As a result of this boron cycle by which the boron impurities of the raw material tend to be retained in the process, the boron content of the entire system increases gradually as operation proceeds, and eventually reaches a value, e. g. 0.002 per cent by weight or more in the solid magnesium chloride cell feed, at which the efficiency of the electrolysis is seriously impaired.

An object of the present invention, then, is to provide a simple and effective method of removing boron impurities from the circulatory system of the magnesium recovery process just described so as to maintain the boron content thereof at a low value and thus to permit continuous operation at unimpaired efficiency even when utilizing magnesia-comprising raw materials containing quite appreciable proportions of boron impurities. This object is attained in the process of the invention by treating the chlorine and hydrogen chloride-containing anode gas evolved in the electrolysis of the magnesium chloride to remove, at least in large part, the gaseous boron compound impurities therefrom at a point prior to the processing of the anode gas to regenerate aqueous hydrochloric acid.

In practice, the removal of gaseous boron compounds is effected by washing the anode gas, as in a gas scrubber, with a solution consisting essentially of water substantially saturated with chlorine and hydrogen chloride under operating conditions, the washing solution being preferably, though not necessarily, maintained at a temperature between about 60° C. and its boiling point. In the washing step, the chlorine, hydrogen chloride, and inert gases, e. g. air, if any, in the anode gas pass through the solution unaffected, but the gaseous boron impurities dissolve in the washing solution, possibly by chemically reacting therewith, and are thus successfully separated from the anode gas. The latter may then be processed to hydrochloric acid which can be re-used in dissolving additional magnesia-containing raw material without causing an undesirable increase in the boron content of the entire system.

The boron compounds removed from the anode gas in the washing step tend, of course, to concentrate in the wash liquor, and must be removed at a rate sufficient to maintain the boron content thereof at a value below that at which the effectiveness of the washing operation is impaired. The removal may be effected in any desired manner, conveniently by distilling the liquor, leaving the boron compound as a non-volatile residue, or in many instances more economically by simply discarding a portion of the liquor and replacing it with fresh solution.

The invention may be further explained with reference to the accompanying drawing, which illustrates diagrammatically the flow of materials in a magnesium recovery system utilizing the new boron removal process.

In the process illustrated, a precipitate of magnesium hydroxide, which has been prepared by the liming of seawater and may contain 0.002 per cent or more of boron compounds, is loaded into neutralizing tanks 1 and is there agitated with an equivalent quantity of 10 to 30 per cent aqueous hydrochloric acid, forming magnesium chloride solution. This latter is subjected to evaporation and drying steps in a recovery plant 2 to form solid magnesium chloride, which also contains most of the boron compounds present in the initial magnesium hydroxide. The solid chloride is then fed into molten salt bath electrolytic cells 3 of conventional design, in which the chloride is decomposed, liberating metallic magnesium, which is withdrawn as product, and generating an anode gas, which, in a typical plant, may contain roughly 4 per cent by weight of elemental chlorine and 3 per cent of hydrogen chloride, the balance being largely air together with about 0.002 per cent of gaseous boron compound impurities.

This anode gas, which may be at a temperature of 300° to 500° C., is then treated to remove the boron impurities by washing it with a solution maintained at a temperature of 60° to 80° C. and consisting of water containing a numerically very small proportion of chlorine and approximately 20 per cent of hydrogen chloride, the solution having been prepared by passing anode gas into water until it became substantially saturated with chlorine and hydrogen chloride. The washing step may be carried out in countercurrent spray tower gas scrubbers 4 of standard design, or by spraying with liquor into the pipe lines through which the anode gas is passing, or both. The wash liquor is collected in sumps and repeatedly recycled into contact with entering anode gas, a small proportion being continuously bled off to waste and replaced by fresh water at a rate sufficient to maintain the boron content of the liquor below about 0.03 per cent.

The purified anode gas leaving the scrubbers 4 will ordinarily contain less than 20 per cent of the boron impurities present in the original anode gas. Thus purified, it is forwarded to a hydrochloric acid production plant 5 in which the chlorine content thereof is converted to aqueous hydrochloric acid in known manner, as by heating the anode gas together with hydrogen, superheated steam, or natural gas to form hydrogen chloride, and absorbing the latter in water. The resulting acid, which has a low boron content, together with make-up acid, if necessary, is then returned to the neutralizers 1 for re-use in the process.

While the process of the invention is primarily useful in removing gaseous boron compounds from chlorine- and hydrogen chloride-containing anode gases derived from magnesium-chloride electrolysis, as already explained, the process may also be applied to the removal of small proportions of gaseous boron compounds from any mixtures thereof with either of the halogen-containing gases chlorine and hydrogen chloride, or from mixtures of these halogen gases with each other or with inert gases. In any such case, removal of the gaseous boron impurity is effected by washing the gas mixture to be purified with an aqueous solution chemically inert to and substantially saturated under operating conditions with the halogen-containing gas; the boron impurities are, as already explained, converted to non-volatile compounds soluble in the wash solution, leaving the gas in a purified state. In the event that gases other than chlorine or hydrogen chloride are also present in the boron-containing gas to be purified, the wash solution should, of course, also be chemically inert to and substantially saturated with such gases.

The foregoing description is illustrative rather than strictly limitative, the invention being coextensive in scope with the following claims:

We claim:

1. In a cyclic process of producing metallic magnesium wherein magnesia-containing material comprising boron compound impurities is treated with aqueous hydrochloric acid to form magnesium chloride solution, from which magnesium chloride is recovered in solid form and is then electrolyzed in the fused state, forming metallic magnesium and liberating an anode gas consisting essentially of chlorine, hydrochloric acid, and air, and comprising in gaseous form at least part of the boron compound impurities of the raw material, and wherein such gas is then processed to regenerate aqueous hydrochloric acid for re-use in the first step of the process; the method of maintaining the boron compound content of the cyclic system at a low value which comprises treating the said anode gas to remove gaseous boron compounds therefrom prior to the processing of the gas to hydrochloric acid by washing such gas with a solution maintained at a temperature of at least 60° C. and consisting essentially of water substantially saturated with chlorine and hydrogen chloride under operating conditions, and removing boron compounds from the washing solution at a rate sufficient to maintain the boron content thereof at a value below that at which the effectiveness of the washing operation is impaired.

2. In a process of producing magnesium from magnesia raw material containing boron as an impurity, wherein the magnesia is dissolved in hydrochloric acid to form a magnesium chloride solution from which solid magnesium chloride is prepared by evaporation and drying and then electrolyzed in the fused state, forming magnesium and liberating an anode gas consisting essentially of chlorine, hydrogen chloride and air but containing volatile boron impurities derived from the magnesia raw material, which gas is processed to convert it to hydrochloric acid for reuse in the process; the method of treating the anode gas to remove the boron impurities therefrom which comprises washing the gas with an aqueous solution substantially saturated with chlorine and hydrogen chloride under operating conditions and repeatedly recycling the washing solution, while withdrawing a portion of the solution containing accumulated boron compound and replacing such withdrawn portion with water.

CLAIRE M. SHIGLEY.
WILLIAM P. SCHAMBRA.